United States Patent
Lammers et al.

(10) Patent No.: US 9,415,643 B2
(45) Date of Patent: Aug. 16, 2016

(54) APPARATUS AND METHOD FOR CONFIGURING A TIRE SENSOR SYSTEM

(71) Applicant: Bendix Commercial Vehicle Systems LLC, Elyria, OH (US)

(72) Inventors: Shawn Lammers, Delta (CA); Sharon A. Seitz, Broadview Heights, OH (US); Joseph M. Macnamara, Ashland, OH (US); Daniel P. Zula, North Ridgeville, OH (US)

(73) Assignee: Bendix Commercial Vehicly Systems LLC, Elyria, OH (US)

(*) Notice: Subject to any disclaimer, the term of this patent is extended or adjusted under 35 U.S.C. 154(b) by 58 days.

(21) Appl. No.: 14/331,297

(22) Filed: Jul. 15, 2014

(65) Prior Publication Data

US 2016/0016444 A1 Jan. 21, 2016

(51) Int. Cl.
*B60C 23/04* (2006.01)
*B60T 7/12* (2006.01)

(52) U.S. Cl.
CPC ......... *B60C 23/0416* (2013.01); *B60C 23/0488* (2013.01); *B60T 7/12* (2013.01)

(58) Field of Classification Search
CPC .... B60C 23/0416; B60C 23/0488; B60T 7/12
USPC ...................................................... 701/29.6
See application file for complete search history.

(56) References Cited

U.S. PATENT DOCUMENTS

| | | | |
|---|---|---|---|
| 6,204,751 | B1 | 3/2001 | Wacker |
| 6,417,766 | B1 | 7/2002 | Starkey |
| 6,446,502 | B1 | 9/2002 | Normann |
| 6,998,974 | B2 | 2/2006 | Bergerhoff |
| 7,245,206 | B2 | 7/2007 | Gronau |

(Continued)

FOREIGN PATENT DOCUMENTS

| | | |
|---|---|---|
| DE | 102010037512 A1 | 3/2012 |
| FR | 2831102 A1 | 10/2002 |
| WO | WO 03086788 | * 10/2003 |

OTHER PUBLICATIONS

European Patent Office "Notification of Transmittal of International Search Report and Written Opinion," Jul. 10, 2015, 9 pages, European Patent Office, Rijswijk NL.

(Continued)

*Primary Examiner* — Rodney Butler
*Assistant Examiner* — Frederick Brushaber
(74) *Attorney, Agent, or Firm* — Cheryl L. Greenly; Brian E. Kondas; Eugene E. Clair (57) ABSTRACT

Various embodiments of an apparatus and method for configuring a tire sensor system are disclosed. In one embodiment, the method begins with rotating a plurality of tires on a vehicle. The tire sensor associated with a first wheel location generates a data transmission in response to the rotation of the plurality of tires, the data transmission comprising at least a unique sensor identification and a motion value. The controller transmits a brake control device control signal in a first predetermined event sequence to a first brake control device associated with the first wheel location. The controller receives the tire characteristic signal and assigns the unique sensor identification with the first wheel location in response to determining the motion value of the tire characteristic signal corresponds with the first predetermined event sequence.

20 Claims, 3 Drawing Sheets

(56) References Cited

U.S. PATENT DOCUMENTS

| | | | |
|---|---|---|---|
| 8,204,655 B2 | 6/2012 | Weston | |
| 8,498,759 B1* | 7/2013 | Juzswik | B60C 23/0416 701/10 |
| 8,593,273 B2 | 11/2013 | Gotschlich | |
| 8,791,807 B2 | 7/2014 | Kessler | |
| 2003/0080860 A1* | 5/2003 | Stewart | B60C 23/0416 340/442 |
| 2003/0090372 A1* | 5/2003 | Bergerhoff | B60C 23/0416 340/438 |
| 2004/0036589 A1* | 2/2004 | Lin | B60C 23/0433 340/445 |
| 2004/0046648 A1* | 3/2004 | Matsuura | B60C 23/061 340/442 |
| 2004/0134270 A1* | 7/2004 | Hirohama | B60C 23/0416 73/146 |
| 2006/0017554 A1* | 1/2006 | Stewart | B60C 23/0444 340/447 |
| 2008/0051963 A1* | 2/2008 | Kagawa | B60C 23/0416 701/70 |
| 2009/0160629 A1 | 6/2009 | Shimura | |
| 2010/0179724 A1 | 7/2010 | Weston | |
| 2010/0256874 A1 | 10/2010 | Carresju | |
| 2010/0292898 A1 | 11/2010 | Stoehr | |
| 2011/0071737 A1* | 3/2011 | Greer | B60C 23/0416 701/49 |
| 2011/0308310 A1 | 12/2011 | Straham | |
| 2011/0313623 A1* | 12/2011 | Greer | B60C 23/0416 701/49 |
| 2012/0010777 A1 | 1/2012 | Allard | |
| 2012/0060598 A1* | 3/2012 | Kessler | B60C 23/0416 73/146.5 |
| 2012/0112899 A1* | 5/2012 | Hannon | B60C 23/0416 340/445 |
| 2012/0194333 A1* | 8/2012 | Kessler | B60C 23/0416 340/445 |
| 2013/0079977 A1* | 3/2013 | Greer | G06F 11/30 701/34.4 |
| 2013/0297107 A1* | 11/2013 | Dai | B60W 10/06 701/22 |
| 2013/0327136 A1 | 12/2013 | Kretschmann | |
| 2014/0365162 A1* | 12/2014 | Mori | B60C 23/0416 702/138 |
| 2014/0371980 A1* | 12/2014 | Sekizawa | B60C 23/0416 701/34.4 |
| 2014/0379291 A1* | 12/2014 | Mori | B60C 23/0416 702/138 |

OTHER PUBLICATIONS

Bendix Commercial Vehicle Systems LLC, BW2799 "Smartire Tire Pressure Monitoring System Operator's Manual", manual, Jun. 2010, 80 pages. Bendix Commercial Vehicle Systems LLC, Elyria Ohio U.S.

\* cited by examiner

APPARATUS AND METHOD FOR CONFIGURING A TIRE SENSOR SYSTEM

BACKGROUND

The present invention relates to embodiments of an apparatus and method for configuring a tire sensor system. Tire sensor systems for vehicle, for example tire pressure monitoring systems, typically include at least one tire pressure sensor in each of the plurality of tires. The tire pressure sensors communicate tire pressure signals wirelessly with a central controller on the vehicle. The wheel from which the tire pressure sensor signal is originating must be identified to indicate properly to the driver or technician which tire is in need of service. One method commonly used to associate a tire pressure sensor with the wheel location in which it is installed is by manually updating the central controller with the tire pressure sensor unique identification code (ID) when the tire with the tire pressure sensor is installed on the vehicle. This method requires time and effort from a trained technician who has the means to activate the tire pressure sensor to obtain the unique ID and then communicate with the central controller.

Trucks and/or tractors typically have at least six tires in which tire pressure sensors are installed. The tires are installed on the truck as one of the last items during an assembly line operation at an original equipment manufacturer. It is a time consuming activity to manually activate each tire pressure sensor to obtain the unique ID and then access the central controller to associate the unique ID with the wheel location in which the tire pressure sensor is installed. Often there is limited time available to add another step to the process. Likewise, whenever a tire is replaced, the central controller needs to be manually updated to associate the new tire pressure sensor unique ID with the proper wheel location.

SUMMARY

Various embodiments of a controller for a tire sensor system are disclosed. In accordance with one aspect, a controller comprises a plurality of brake control device ports for transmitting control signals, each of the brake control device ports correlated with a specific wheel location, a communication port for receiving a data transmission from each of a plurality of tire sensors, wherein the data transmissions from each of the plurality of tire sensors includes a unique sensor identification and a motion value; and a processing unit comprising control logic, wherein the processing unit is in communication with the plurality of brake control device ports and the communication port. The control logic is capable of transmitting control signals in a predetermined event sequence to a first brake control device port associated with a first wheel location; receiving a data transmission at the communication port including a first unique sensor identification and a first motion value within a predetermined time period of transmitting the control signal; determining the data transmission as originating from the first wheel location when the first motion value corresponds to the predetermined event sequence; and assigning the first unique sensor identification to the first wheel location.

In accordance with another aspect, a method for configuring a tire sensor system comprises rotating a plurality of tires on a vehicle to a constant speed. A controller transmits a brake device control signal conforming to a first (predetermined event sequence to a first brake control device associated with the first wheel location. The first tire sensor generates a data transmission in response to the brake device control signal; the data transmission includes a first unique sensor identification and a first acceleration value. The controller receives the data transmission and assigns the first unique sensor identification with the first wheel location in response to determining that the acceleration value of the tire characteristic signal corresponds with the first predetermined event sequence.

Another embodiment of a method for configuring a tire sensor system comprises rotating a plurality of tires on a vehicle to a constant speed. A controller transmits a brake device control signal conforming to first predetermined event sequence to a first brake control device associated with the first wheel location. The first tire sensor generates a data transmission in response to the brake device control signal; the data transmission includes a first unique sensor identification and a first acceleration value. The controller receives the data transmission and assigns the first unique sensor identification with the first wheel location in response to determining that the acceleration value of the tire characteristic signal corresponds with the first predetermined event sequence. Then the controller receives a first wheel speed signal at first wheel speed port at the controller and determines if the data transmission originates from the first wheel location when the first wheel speed signal corresponds to the predetermined event sequence. The controller verifies the first unique sensor identification is assigned to the first wheel location based on the wheel speed signal.

In accordance with another aspect, a system for configuring a tire sensor system on a vehicle comprises a plurality of wheel speed sensors, wherein each of the plurality of wheel speed sensors is associated with a respective wheel location on a vehicle and a plurality of tire sensors, wherein each of the plurality of tire sensors is associated with a respective wheel location on the vehicle and each of the plurality of tire sensors capable of transmitting a data transmission. The system also comprises a wireless receiver for receiving the plurality data transmissions; a serial communications bus in communication with the wireless receiver and a controller; and the controller. The controller comprises a plurality of brake device output ports; a communication port in communication with the serial communication bus and a processing unit comprising control logic. The control logic communicates with the plurality of brake device ports and the communication port, the control logic capable of transmitting a brake device control signal in a first predetermined event sequence to a first brake control device associated with the first wheel location; receiving a data transmission from a first tire sensor; and associating the first tire characteristic sensor with the first wheel location in response to determining that the acceleration information of the tire characteristic signal corresponds with the first predetermined event sequence.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
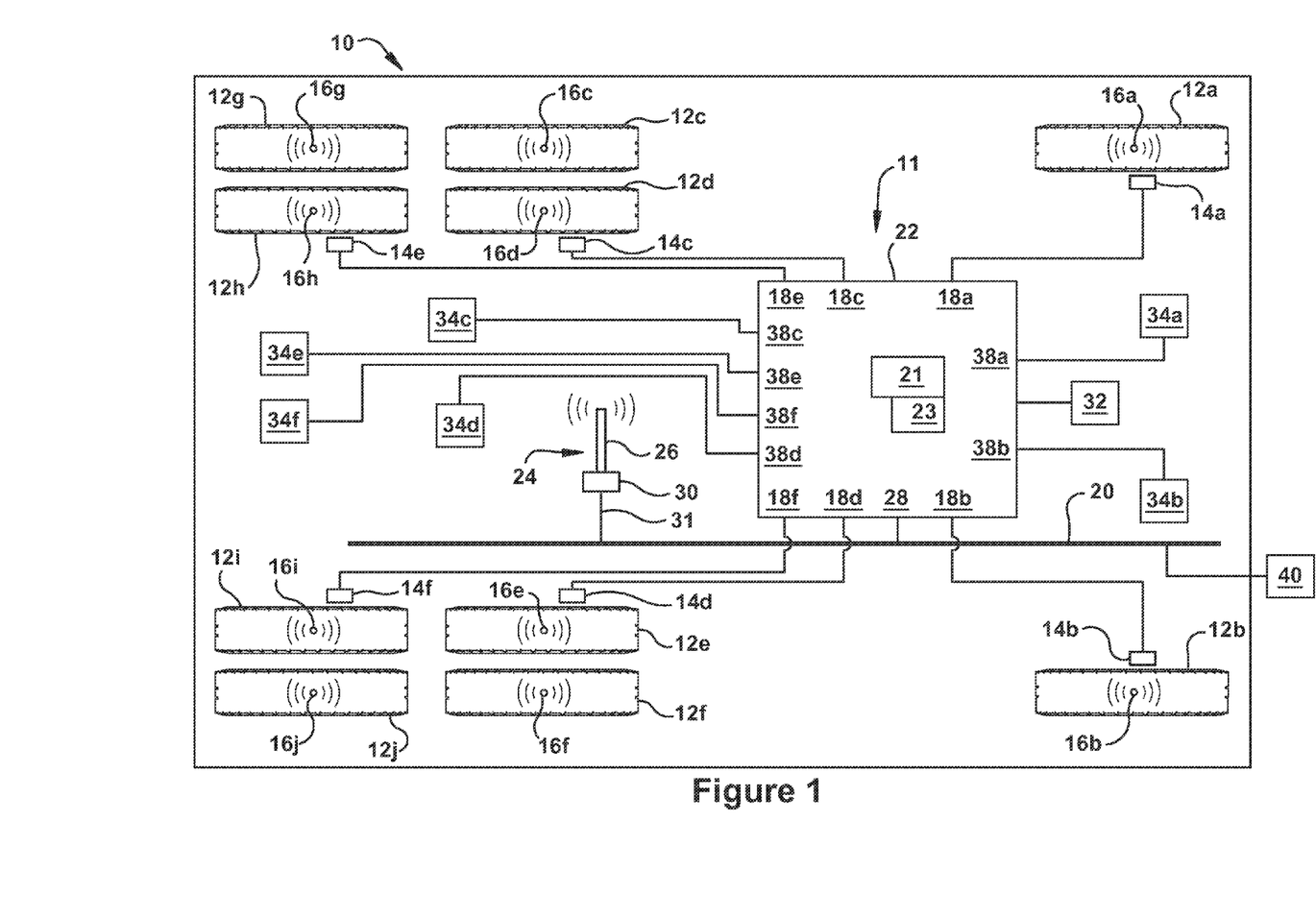
FIG. 1 illustrates a schematic representation of a tire sensor system according to an embodiment of the present invention.

With reference to FIG. 1, a vehicle 10 with a tire sensor system 11 is illustrated, according to an embodiment of the present invention. The vehicle 10, a tractor or a truck, generally has at least six wheel locations and at least six tires. The wheel locations include right front, right mid, right rear, left front, left mid and left rear. The right mid, right rear, left mid and left rear wheel locations include an inner and an outer wheel location if dual tires are placed at these locations. A sample tire placement is illustrated in FIG. 1 with tire 12a at the left front, tire 12b at the right front, tire 12c at the outer left mid, tire 12d at the inner left mid, tire 12e at the inner right mid, tire 12f at the outer right mid, tire 12g at the outer left rear, tire 12h at the inner left rear, tire 12i at the inner right rear, and tire 12j at the outer right rear. Additional or fewer tires are contemplated.

Each tire in the tire sensor system 11 includes a tire sensor, illustrated by tire sensors 16a, 16b, 16c, 16d, 16e, 16f, 16g, 16h, 16i, 16j. The tire sensor 16a, 16b, 16c, 16d, 16e, 16f, 16g, 16h, 16i, 16j can be mounted inside the respective tires 12a, 12b, 12c, 12d, 12e, 12f, 12g, 12h, 12i, 12j on the rim or outside the tires on a valve stem. The tire sensors 16a, 16b, 16c, 16d, 16e, 16f, 16g, 16h, 16i, 16j monitor tire characteristic information, such as the tire pressure, tire temperature, sensor battery voltage, vehicle load and tire vibration. The tire sensors can include an accelerometer or centrifugal switch to indicate a motion value, such as rotation of the wheel. The tire sensors 16a, 16b, 16c, 16d, 16e, 16f, 16g, 16h, 16i, 16j can be tire sensors, for example, used in the Smartire® Tire Pressure Monitoring System from Bendix Commercial Vehicle Systems LLC, of Elyria, Ohio. Each tire sensor 16a, 16b, 16c, 16d, 16e, 16f, 16g, 16h, 16i, 16j comprises a wireless transmitter that periodically transmits signals containing the tire and sensor related information and a unique sensor identification code (ID) in a selected data transmission format. The format of the signal can be a standard or a proprietary radio frequency (RF) protocol. The tire sensors 16a, 16b, 16c, 16d, 16e, 16f, 16g, 16h, 16i, 16j can also be configured to transmit data transmission upon rotation of the tire or when there is a tire pressure alert event. In one embodiment, the tire sensor transmits a data transmission every three seconds when the acceleration value changes.

The tire sensor system 11 optionally includes a wireless receiver 24. The wireless receiver 24 includes an antenna 26, a processing unit 30 and a communication port 31. The wireless receiver 24 receives the data transmissions in the selected data format containing the unique sensor ID from the tire sensors 16a, 16b, 16c, 16d, 16e, 16f, 16g, 16h, 16i, 16j wirelessly. The signals also include a motion value and a tire pressure value. The wireless receiver 24 decodes the tire characteristic information from the selected data transmission format to a tire characteristic message capable of being communicated on a serial communication bus 20. The format of the tire characteristic message may he a standard protocol, such as SAE J1939, or a proprietary protocol. The wireless receiver 24 is capable of communicating at least one tire characteristic message over the serial communication bus 20 via the communication port 31. The tire characteristic message can include, but is not limited to, information such as the instantaneous tire pressure, the comparison of the tire pressure against a tire pressure limit, motion value and the unique sensor ID, for example.

The vehicle 10 includes a wheel speed sensor 14a, 14b, 14c, 14d, 14e, 14f at each wheel location. Each wheel speed sensor 14a, 14b, 14c, 14d, 14e, 14f monitors the wheel speed at the wheel location. There can be fewer wheel speed sensors or a wheel speed sensor for each tire when more than one tire is located at a wheel location, such as with dual tire installations.

The vehicle 10 includes a brake control device 34a, 34b, 34c, 34d, 34e, 34f at each wheel location. Each brake control device 34a, 34b, 34c, 34d, 34e, 34f is used for antilock braking and/or stability control. There can be a single brake control device or a brake control device for each tire when more than one tire is located at a wheel location, such as with dual tire installations. In one example, the brake control device is an antilock brake control modulator. In another example, the brake control device is an electropneumatic device.

The tire sensor system 11 includes a controller 22. The controller 22 can be a stand-alone controller or include functionality for controlling the antilock braking system in addition to tire pressure monitoring. The brake control devices 34a, 34b, 34c, 34d, 34e, 34f receive control signals from the controller 22 from a plurality of brake control device ports 38a, 38b, 38c, 38d, 38e, 38f on the controller 22. The brake control devices receive an air supply from either the application of the brake treadle (not shown) by the driver or from a valve (not shown) that is independently controlled by the controller 22 to provide supply pressure independent of the driver's brake application.

As shown in FIG. 1, the brake control device port 38a is associated with the brake control device 34a, which is located at the left front wheel location. Similarly brake control device port 38b is associated with brake control device 34b, which is located at the left front wheel location, etc. The wiring for vehicle 10 is configured so that the brake control device 34a located at the left front wheel end section is connected to the brake control device port 38a on the controller. A vehicle may be configured with six brake control devices or four brake control devices or other number depending on the braking systems installed on the vehicle.

The wheel speed sensors 14a, 14b, 14c, 14d, 14e, 14f communicate wheel speed to the controller 22 via a hardwired connection through individual wheel speed ports 18a, 18b, 18c, 18d, 18e, 18f on the controller 22. As shown in FIG. 1, wheel speed port 18a is associated with the wheel speed sensor 14a, which is located at the left front wheel location. Similarly wheel speed port 18b is associated with wheel speed sensor 14b, which is located at the left front wheel location, etc. Similar to the brake control devices, the wiring for vehicle 10 is configured so that the wheel speed sensor 14a located at the left front wheel end section is connected to wheel speed port 18a on the controller. Alternatively, the wheel speed information is received via another means, such as over the serial communication bus 20 or via a wireless receiver, in addition to or instead of a hardwired connection.

The controller 22 includes a communication port 28 for communicating with the serial communication bus 20 on the vehicle 10. Controller 22 may communicate with other controllers on the vehicle 10 using the serial communication bus 20. The messages received and transmitted on the bus can be in a standardized serial communication bus format, such as SAE J1939, or in a proprietary format.

The controller 22 includes a processing unit 21. The processing unit 21 includes control logic 23 and is in communication with the plurality of brake control device ports 38a, 38b, 38c, 38d, 38e, 38f, the plurality of wheel speed sensor ports 18a, 18b, 18c, 18d, 18e, 18f and the communication port 28. The processing unit 21 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit.

The control logic 23 is capable of transmitting control signals to the brake control device ports 38a, 38b, 38c, 38d, 38e, 38f to control the brake control devices 34a, 34b, 34c, 34d, 34e, 34f. The control signals are transmitted in a predetermined event sequence, as described further below.

The control logic 23 receives messages from the serial communication bus 20 via the communication port 28. The messages include tire characteristic messages as transmitted on the serial communication bus 20 from the wireless receiver 24. The control logic 23 also transmits messages to the serial communication bus 20 via the communication port 28. The transmitted messages include the tire characteristic messages with associated wheel location and the wheel speed.

In alternative embodiment the wireless receiver 24 is integrated with the controller 22. In this arrangement, the control logic 23 of the controller 22 decodes the data in the tire characteristic signals directly from the antenna 26 rather than monitor the serial communication bus 20 for the separate tire characteristic messages.

The tire sensor system 11 optionally includes a display device 32. The display device may be connected with the controller 22 or to the serial communication bus 20. The display device 32 communicates the status of the tire sensor system 11 to a vehicle operator or technician. Optionally, the control logic 23 can record a fault and transmit a fault signal directly to the display device 32 or via the serial communication bus 20.

Optionally, a computing device 40 located separately from the tire sensor system 11 may be connected to the serial communication bus 20. The computing device 40 stores the tire characteristic messages and creates a build log. The build tog associates each tire with a specific tire sensor in a format usable by the vehicle original equipment manufacturer as the tire sensor system 11 is configured.

As stated previously, there is a need for an improved system to configure a tire pressure monitoring system for tractors and trucks to each tire sensor is quickly and accurately assigned to the wheel location where it is installed. The method of configuring the tire pressure monitoring system does not require a separate download of sensor identification numbers to the central controller or additional tools such as sensor initiators. The method can also be used to identify tire sensor locations on other multi-wheeled vehicles, such as trailers.

Accordingly, in an embodiment of the present invention, the controller comprises a plurality of brake control device ports for transmitting control signals, each of the brake control device ports is correlated with a specific wheel location; a communication port for receiving data transmissions from a plurality of tire sensors, wherein the data transmissions includes a unique sensor identification and a motion value; and a processing unit comprising control logic, wherein the processing unit is in communication with the plurality of brake control device ports and the communication port. The control logic is capable of transmitting control signals in a predetermined event sequence to a first brake control device port associated with a first wheel location; receiving a data transmission at the communication port including a first unique sensor identification and a first motion value within a predetermined time period of transmitting the control signal; determining the data transmission as originating from the first wheel location when the first motion value corresponds to the predetermined event sequence and assigning the first unique sensor identification to the first wheel location.

Figure 2:
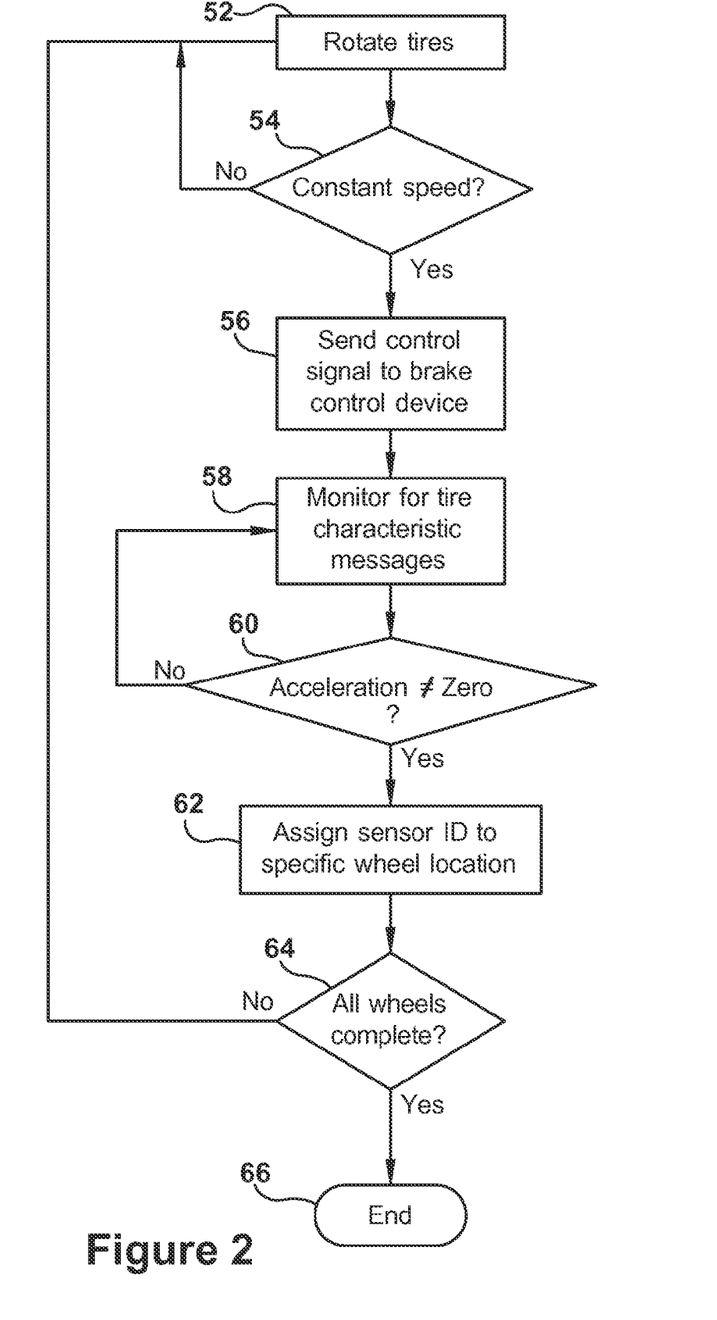
FIG. 2 illustrates a method of implementing the tire sensor system, according to an embodiment of the present invention.

A flowchart for implementing a method 50 of the present invention is shown in FIG. 2. Prior to the implementation of the method 50, each tire 12a, 12b, 12c, 12d, 12e, 12f, 12g, 12h, 12j is placed at a specific wheel location on the vehicle. Alternatively, one tire can be placed at a specific wheel location at a time and the method executed in a predetermined sequence. Each tire 12a, 12b, 12c, 12d, 12e, 12f, 12g, 12h, 12j has a tire sensor 16a, 16b, 16c, 16d, 16e, 16f, 16g, 16h, 16i, 16j installed. For the present illustration, tire 12a is located on the left front wheel end section of the vehicle. Tire 12b is located on the right front wheel end section of the vehicle. Tire 12c is located at the outer left mid wheel location and 12d is located at the inner left mid wheel end section. Tire 12e is located at the inner right mid wheel location and 12f is located in the outer right mid wheel location. Tire 12g is located at the outer left rear wheel location and 12h is located in the inner left rear wheel location. Tire 12i is located at the inner right rear wheel location and 12j is located at the outer right rear section of the vehicle. The tire placement is done by a vehicle original equipment manufacturer or by a technician servicing the vehicle. At this point, the controller 22 does not have information regarding the placement of the tires 12a, 12b, 12c, 12d, 12e, 12f, 12g, 12h, 12j at a specific wheel location.

The vehicle 10 is then placed on a test device, such as a chassis dynamometer from Link Engineering of Plymouth Mich. The dynamometer is a device that allows a vehicle to be tested while running at a chosen speed, but keeps the vehicle stationary. Dynamometers are typically used by vehicle original equipment manufacturers for end of line testing of vehicles. The tires 12a, 12b, 12c, 12d, 12e, 12f, 12g, 12h, 12i, 12j can be rotated by a dynamometer or other an automated rotation device. Alternatively, the vehicle 10 can be place in a test mode by the vehicle operator during normal operation of the vehicle 10.

In step 52 of method 50, the vehicle 10 on which the tire sensor system 11 is to be configured has the tires rotated at a predetermined speed. The tires should be rotated for a minimum of about fifteen seconds at a speed of about three miles per hour. The tires can be rotated in pairs, such as tires 12a, 12b on the front axle being rotated separately from the tires 12c, 12d, 12e, 12f, 12g, 12h, 12i, 12j on the rear axle. The method 50 determines if the wheels are at a constant speed in step 54. In other words, all of the wheels are running at the same speed for a period of time. The speed of the tires can be determined using the wheel speed sensors 14a, 14b, 14c, 14d, 14e, 14f or other means. When at constant speed, the motion value sensed by any tire sensor is zero. When the vehicle 10 is at constant speed, the method proceeds to step 56. If the vehicle 10 is not at constant speed, the method returns to step 52.

In step 56, the controller 22 sends a brake control device control signal to a single brake control device output port. For example, the controller 22 sends a brake control device control signal to the brake control device output port 38a to control the brake control device 34a on the left front wheel location. The controller 22 sends a single control signal or sends multiple control signals in a predetermined event sequence. The predetermined event sequence may be different for each wheel location or may be consistent for each wheel location. In one example, the control signal is sent as a pulse width modulated format. Each time the brake control device 34a receives a brake control signal, the brake control device 34a responds by opening and closing a pathway for air to reach the brake at the wheel end. When supply air is at the brake control device 34a and the brake control device 34a opens to provide air to the wheel end brake assembly, the brake control device 34a induces deceleration at the wheel end to which it is connected. The controller 22 monitors the time at which the controller 22 sent the control signal.

The controller 22 monitors for tire characteristic messages in step 58. When braking is induced at a wheel end, the motion value of the tire sensor in that particular wheel end will change in response to the deceleration that occurs. In one example, the tire sensor transmits a data transmission when the motion value changes in response to the deceleration. For example, a tire sensor will transmit a data transmission every three seconds when there is a change in the motion value. In another example, the tire sensor will periodically transmit a data transmission every five minutes when there is no change in the motion value or tire pressure value. In the tire sensor system 11 that includes a wireless receiver 24, the data transmissions are formatted into a tire characteristic message at the wireless receiver 24. When the controller 22 receives a tire characteristic message at the communication port 28, the controller 22 analyzes the tire characteristic message for a motion value.

If no tire characteristic message is received within a predetermined time period after the brake control signal is transmitted, the controller 22 will indicate that there is a fault in the tire sensor system 11 and discontinue the method 50. In one embodiment, the predetermined time period is between about five seconds and about fifteen seconds. In another embodiment, the predetermined time period is about ten seconds.

In step 60, the message is evaluated for the value of the motion value, which generally indicates a change in acceleration. The acceleration information is compared to the predetermined event sequence. In one example, a predetermined event sequence of three short brake control signals in a row induces three deceleration events at the wheel end to which the brake control device is connected. The other wheel ends will have zero change in acceleration because the dynamometer continues to run at constant speed and no deceleration is induced at those wheel ends since there is no brake control signal transmitted to the brake control devices associated with those wheel ends. Therefore, the control logic 23 determines that a tire message with a motion value other than zero is from the tire sensor in the wheel being decelerated in response to the brake control signal since the change in the motion value corresponds with predetermined event sequence.

In addition, for a dual tire installation, a positive acceleration and negative acceleration on the complementary tires occurs. When dual tires are installed, the tire sensors are identified by rim style so that the tire sensor for the inner tire will show acceleration in the positive direction and the tire sensor for the outer tire will show negative acceleration when the tires are rotated. For example, on the left rear tires 12g, 12h, the inner tire 12h has a positive installation and the outer tire 12g has a negative installation. When the left rear tires 12g, 12h are rotated and subsequently the brake control signal is transmitted to brake control device to 34e, tire sensors 16h, 16g experience a change in acceleration for which the tire sensor 16h exhibit positive acceleration and the tire sensor 16g will exhibit negative acceleration. If the acceleration is zero, the method returns to step 58 to monitor for additional tire characteristic messages.

In step 62, the controller 22 assigns the unique sensor ID of the tire sensor that was activated by the deceleration induced by the brake control device with the wheel location associated with the brake control device. The unique sensor ID will remain assigned to that wheel end until the method 50 is run again.

The method 50 continues with step 64 where the controller 22 determines if all wheel ends have been assigned to a particular tire sensor. If not, the routine returns to step 52. If all of the wheel ends have been assigned to a particular tire sensor, the method ends at step 66.

Figure 3:
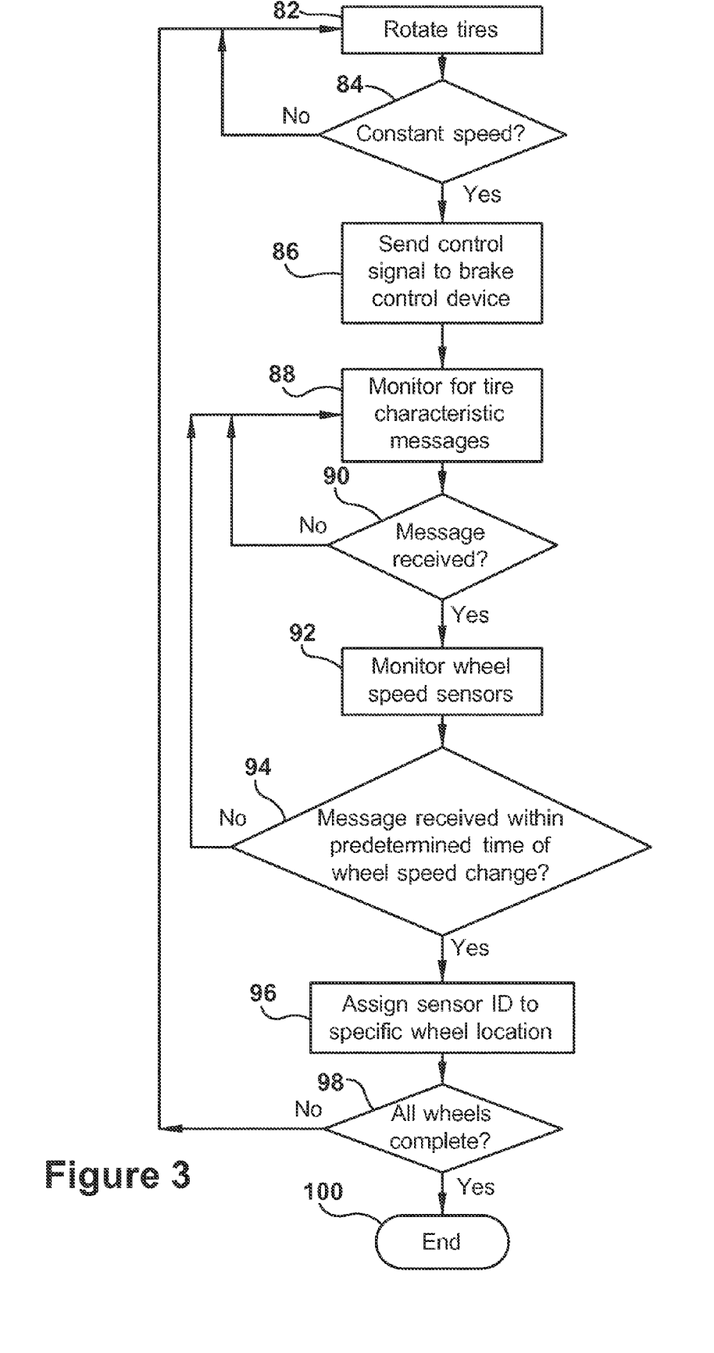
FIG. 3 illustrates another method of implementing the tire sensor system, according to an embodiment of the present invention.

A flowchart for implementing another method 80 of the present invention is shown in FIG. 3. Similar to the beginning of the method 50, each tire 12a, 12b, 12c, 12d, 12e, 12f, 12g, 12h, 12j is placed at a specific wheel location on the vehicle. At this point, the controller 22 does not have information regarding the placement of the tires 12a, 12b, 12c, 12d, 12e, 12f, 12g, 12h, 12j at a specific wheel location.

For the first step in method 80, the tires are rotated to a predetermined speed. For example, the tires can be rotated for a minimum of about fifteen seconds at a speed of about three miles per hour. The tires can be rotated in pairs, such as 12a, 12b on the front axle, or all of the tires 12a, 12b, 12c, 12d, 12e, 12f, 12g, 12h, 12i, 12j can be rotated at one time. The method 80 determines if the wheels are at a constant acceleration in step 84. In other words, all of the wheels are running at the same speed for a period of time. The acceleration of the tires can be determined using the wheel speed sensors or other means. If the vehicle is not at constant speed, the method returns to step 82. When at substantially constant acceleration, the motion value sensed by each tire sensor is zero. When the vehicle 10 is at constant speed, the method proceeds to step 86.

In step 86, the controller 22 sends a brake control device control signal to a single brake control device output port. For example, the controller 22 sends a brake control device control signal to brake control device output port 38a to control the brake control device 34a on the left front wheel location. The controller 22 sends a single control signal or sends multiple control signals in a predetermined event sequence. In one example, the control signal may be sent as a pulse width modulated format. The brake control device 34a responds by opening and closing a pathway for air to reach the brake at the wheel end. When supply air is at the brake control device, the brake control device will induce braking at the wheel end to which it is connected. The controller 22 monitors the time at which the controller 22 sent the control signal.

The controller 22 monitors for a tire characteristic message in step 88. When braking is induced at a wheel end, the motion value of the tire sensor in that particular wheel end will change in response to the deceleration that occurs. In one example, the tire sensor transmits a data transmission when motion occurs. When the controller 22 receives a tire characteristic message at the communication port 28, the controller 22 analyzes the tire characteristic message for a motion value. If no tire characteristic message is received within a predetermined time period after the brake control signal is transmitted, the controller 22 will indicate that there is a fault in the tire sensor system 11 and either return to step 88 or discontinue method 80. In one embodiment, the predetermined time period is between about five seconds and about fifteen seconds. In another embodiment, the predetermined time period is about ten seconds.

In step 92, the wheel speed sensors 14a, 14b, 14c, 14d, 14e, 14f are monitored. The wheel speed at a wheel will also change in response to induced braking. When the tire characteristic message includes a change in the motion value, indicating a change in acceleration, the motion value is compared to the change in the wheel speed at the particular wheel.

If the change in wheel speed correlates with the induced braking, the controller 22 assigns the tire sensor unique ID to that wheel end.

The method 80 continues with step 98 where the controller 22 determines if all wheel ends have been assigned to a particular tire sensor. If not, the routine returns to step 82. If all of the wheel ends have been assigned to a particular tire sensor, the method ends at step 100.

Accordingly, a method for configuring a tire sensor system is disclosed. The method begins with rotating a plurality of tires on a vehicle. The tire sensor associated with a first wheel location generates a tire characteristic signal in response to the rotation of the plurality of tires, the tire characteristic signal comprising a unique sensor identification and a motion value, for example, acceleration information. The controller transmits a brake control device control signal conforming to a first predetermined event sequence to a first brake control device associated with the first wheel location. The controller receives the tire characteristic signal, and assigns the unique sensor identification with the first wheel location in response to determining the acceleration information of the tire characteristic signal corresponds with the first predetermined event sequence.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller comprising:
    a plurality of brake control device ports for transmitting control signals, each of the brake control device ports correlated with a specific wheel location;
    a communication port for receiving a data transmission from each of a plurality of tire sensors, wherein the data transmissions from each of the plurality of tire sensors includes a unique sensor identification and a motion value; and
    a processing unit comprising control logic, wherein the processing unit is in communication with the plurality of brake control device ports and the communication port, the control logic capable of:
        transmitting at least one control signal to a first brake control device port associated with a first wheel location, wherein a deceleration is induced at the first wheel location in response to the at least one control signal;
        receiving a data transmission at the communication port from a first tire sensor including a first unique sensor identification and a first motion value within a predetermined time period of transmitting the at least one control signal, wherein the first motion value is indicative of a deceleration of a tire in which the first tire sensor is installed;
        determining the data transmission as originating from the first wheel location when the first motion value indicative of the deceleration of the tire in which the first tire sensor is installed corresponds to the deceleration induced by the at least one control signal; and
        assigning the first unique sensor identification to the first wheel location.

2. The controller as in claim 1, further comprising:
    a plurality of wheel speed ports for receiving wheel speed sensor signals, each of the plurality of wheel speed ports correlated with a specific wheel location, wherein the processing unit is in communication with the plurality of wheel speed ports; and
    the control logic is capable of:
        receiving a signal indicative of a wheel speed at a first wheel speed port corresponding with the first wheel location;
        determining the data transmission as originating from the first wheel location when the change in the wheel speed signal corresponds to the at least one control signal; and
        verifying the first unique sensor identification is assigned to the first wheel location based on the wheel speed signal.

3. The controller as in claim 1, wherein the at least one control signal is transmitted to the first brake control device port in a first sequence and the at least one control signal is transmitted to a second brake control port in a second sequence, the second sequence different from the first sequence.

4. The controller as in claim 1, wherein the control logic is capable of transmitting a tire characteristic message to a serial communication bus, the message comprising the assignment of the first wheel location with the first unique sensor identification and tire characteristic information.

5. The controller as in claim 4, wherein the tire characteristic information comprises at least one of: a tire pressure, sensor battery level, tire rotation and a tire temperature.

6. The controller as in claim 4, wherein the control logic is capable of transmitting the tire characteristic message to a computing device via the serial communication device, the computing device storing the tire characteristic message and creating a build log.

7. The controller as in claim 1, wherein the predetermined time period is between about five seconds and about fifteen seconds.

8. The controller as in claim 1, wherein the controller is a braking system controller.

9. The controller as in claim 1, wherein the control logic is capable of transmitting a diagnostic trouble code to at least one of a serial communication bus and a display device when the tire characteristic message is not received within the predetermined time period.

10. The controller as in claim 1 wherein the control logic is further capable of:
    transmitting the at least one control signal to a second brake control device port associated with a second wheel location subsequent to transmitting the at least one control signal to the first brake control device port, wherein a deceleration is induced at the second wheel location in response to the at least one control signal;
    receiving a data transmission at the communication port from a second tire sensor including a second unique sensor identification and a second motion value within a predetermined time period of transmitting the at least one control signal, wherein the second motion value is indicative of a deceleration of a tire in which the second tire sensor is installed;
    determining the data transmission as originating from the second wheel location when the second motion value indicative of the deceleration of the tire in which the second tire sensor is installed corresponds to the deceleration induced by the at least one control signal; and
assigning the second unique sensor identification to the second wheel location.

11. A method for configuring a tire sensor system comprising:
transmitting a brake device control signal from a controller to a first brake control device associated with a first wheel location; wherein transmitting the brake device control signal results in a reduction of a wheel speed signal from the first wheel location;
receiving a data transmission generated by a first tire sensor associated with a first wheel location in response to the brake device control signal, the data transmission including a first unique sensor identification and a first motion value, wherein the first motion value is indicative of a reduction of wheel speed at the first wheel location;
receiving the data transmission from the first tire sensor at the controller; and
assigning the first unique sensor identification with the first wheel location in response to determining that the first motion value of the data transmission corresponds with the reduction of the wheel speed signal induced by the at least one control signal.

12. The method as in claim 11, further comprising: transmitting a tire characteristic message from the controller, the tire characteristic message comprising the assignment of the first wheel location with the first unique sensor identification and tire characteristic information.

13. The method as in claim 11, comprising transmitting a diagnostic trouble code from the controller to at least one of a serial communication bus and a display device when a predetermined time period has elapsed and the data transmission has not been received.

14. The method as in claim 13, wherein the predetermined time period is between about five seconds and about fifteen seconds.

15. The method as in claim 11 further comprising:
receiving a first wheel speed signal at a first wheel speed port at the controller, the first wheel speed port correlated with a first wheel location, and
determining the data transmission as originating from the first wheel location when the first wheel speed signal corresponds to the reduction of the first wheel speed signal; and
verifying the first unique sensor identification is assigned to the first wheel location based on the wheel speed signal.

16. The method as in claim 11 further comprising:
transmitting a brake device control signal from the controller to a second brake control device associated with a second wheel location;
receiving a data transmission generated by a second tire sensor associated with the second wheel location in response to the brake device control signal, the data transmission including a second unique sensor identification and a second motion value within a predetermined time period of transmitting the control signal; and
assigning the second unique sensor identification to the second wheel location in response to determining that the motion value of the data transmission indicating a reduction in the wheel speed signal corresponds to the reduction in the wheel speed induced by the at least one brake control signal.

17. A system for configuring a tire sensor system on a vehicle comprising:
a plurality of wheel speed sensors, wherein each of the plurality of wheel speed sensors is associated with a respective wheel location on a vehicle;
a plurality of tire sensors, wherein each of the plurality of tire sensors is associated with a respective wheel location on the vehicle and each of the plurality of tire sensors capable of transmitting a data transmission;
a plurality of brake control devices, wherein each of the plurality of brake control devices is associated with a respective wheel location on the vehicle;
a wireless receiver for receiving the plurality data transmissions;
a serial communications bus in communication with the wireless receiver and a controller; and
the controller comprising;
a plurality of brake control device output ports;
a communication port in communication with the serial communication bus;
a processing unit comprising control logic, the control logic communicating with the plurality of brake device ports and the communication port, the control logic capable of transmitting a brake control device control signal to a first brake control device associated with the first wheel location, wherein transmitting the brake device control signal results in a reduction of a wheel speed signal from the first wheel location; receiving a data transmission from a first tire sensor; and associating the first tire characteristic sensor with the first wheel location in response to determining that the acceleration information of the tire characteristic signal corresponds to the reduction in the wheel speed signal induced by the at least one control signal within a predetermined time period.

18. The system as in claim 17, wherein the wireless receiver is integral to the controller.

19. The system as in claim 17 wherein the tire characteristic signal comprises at least one of: a sensor identification number, acceleration information, a tire pressure and a tire temperature.

20. The system as in claim 17, wherein the brake control device is an antilock brake modulator.

* * * * *